United States Patent
Keehr

(10) Patent No.: US 8,077,878 B2
(45) Date of Patent: Dec. 13, 2011

(54) LOW-POWER ON-CHIP HEADSET SWITCH DETECTION

(75) Inventor: Edward A. Keehr, Pasadena, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1282 days.

(21) Appl. No.: 11/494,155

(22) Filed: Jul. 26, 2006

(65) Prior Publication Data

US 2008/0044004 A1 Feb. 21, 2008

(51) Int. Cl.
*H04R 3/00* (2006.01)

(52) U.S. Cl. .......................... 381/92; 381/123; 381/120

(58) Field of Classification Search .................. 381/59, 381/12, 183, 187, 311, 26, 74, 300, 334, 381/91, 111, 112, 113, 114, 92, 120, 123; 379/430, 433, 79, 428, 434, 387, 395; 455/569, 455/90, 351, 89, 66, 575, 550, 556, 557
See application file for complete search history.

(56) References Cited

U.S. PATENT DOCUMENTS

| 5,978,689 A | 11/1999 | Tuoriniemi | |
| 6,545,540 B1 * | 4/2003 | Enriquez | 330/288 |
| 6,608,905 B1 * | 8/2003 | Muza et al. | 381/111 |
| 2006/0255812 A1 * | 11/2006 | Martin et al. | 324/609 |
| 2008/0226100 A1 * | 9/2008 | Oddoart et al. | 381/120 |

FOREIGN PATENT DOCUMENTS

GB 2317783 4/1998

OTHER PUBLICATIONS

International Search Report—PCT/US07/074525—International Search Authority—European Patent Office—Dec. 13, 2007.
Written Opinion—PCT/US07/074525, International Search Authority—European Patent Office—Dec. 13, 2007.

* cited by examiner

*Primary Examiner* — Vivian Chin
*Assistant Examiner* — Leshui Zhang
(74) *Attorney, Agent, or Firm* — Howard D. Seo

(57) ABSTRACT

An integrated circuit within a cellular telephone has a wake mode and a sleep mode. In the wake mode, a voltage regulator supplies a regulated voltage onto a MIC BIAS terminal. This voltage biases a microphone of a headset/microphone accessory that is coupled to the cellular telephone. If the user presses a switch on the accessory, then a large current is drawn out of the MIC BIAS terminal. This switch press condition is detected by an ADC within the integrated circuit. In the sleep mode, the regulator and ADC are disabled to conserve power. A novel switch detect circuit supplies a current out of the MIC BIAS terminal at an unregulated voltage. If the user presses the switch, then the current supplied from the MIC BIAS terminal increases. This switch press condition is detected over temperature, voltage and process conditions by a special inverter in the switch detect circuit.

26 Claims, 5 Drawing Sheets

| | TVP EXTREME #1 | TVP NOMINAL | TVP EXTREME #2 |
|---|---|---|---|
| | R=7.6K<br>$V_{DD}$=2.5V<br>TEMP=27C<br>FAST | R=10K<br>$V_{DD}$=2.6V<br>TEMP=27C<br>NOMINAL | R=12.6K<br>$V_{DD}$=2.5V<br>TEMP=27C<br>SLOW |
| SWITCH OFF | 0.77V | 0.98V | 1.18V |
| OPTIMAL THRESHOLD | 1.24V | 1.54V | 1.71V |
| THRESHOLD ($V_T$) | 1.38V | 1.55V | 1.52V |
| SWITCH ON | 1.70V | 2.10V | 2.23V |

THRESHOLD OF INVERTER

LOW-POWER ON-CHIP HEADSET SWITCH DETECTION

BACKGROUND INFORMATION

1. Field

The disclosed embodiments relate to headset switch press detection.

2. Background Information

Cellular telephones often have a headset/microphone accessory. The headset/microphone accessory typically involves two speakers, one for the left ear and one for the right ear. The speakers are usable to listen to audio that is output from the cellular telephone. The headset/microphone accessory also has a microphone. Rather than speaking into the microphone on the body of the cellular telephone, the user can speak into the microphone on the accessory. The accessory is therefore useful for hands free operation of the cellular telephone.

As the user speaks into the microphone on the accessory, the effective resistance of the microphone varies. A resistor of fixed resistance is placed in series with the microphone to form a voltage divider so that the changing microphone resistance is converted into a changing voltage between ground potential and a voltage on the center tap of the voltage divider. The changing voltage is the audio input signal that is detected by an integrated circuit within the cellular telephone. The integrated circuit includes a voltage regulator that supplies a regulated voltage onto a terminal called the microphone bias (MIC BIAS) terminal of the integrated circuit. The voltage divider is coupled to the MIC BIAS terminal so that the regulated MIC BIAS voltage properly biases the voltage divider.

In addition to being usable to convert sound into an audio input signal, the headset/microphone accessory may also include a pushbutton switch. The cell phone user can press the pushbutton switch to send a control signal to cellular telephone. The function of the control signal typically depends on the operating mode of the cellular telephone. For example, if the cellular telephone rings, some cellular telephones allow the user to pick up the call by pressing the pushbutton switch. When the pushbutton switch is pressed, the switch effectively shorts out the microphone. Although speech from the user is not being converted into a usable audio input signal during the switch press condition, this is acceptable because the headset/microphone accessory is being used to communicate the control signal to cellular telephone. When the switch is pressed, an unusually large amount of current is drawn out of the MIC BIAS terminal for an unusually large amount of time. This high current condition is detected by the integrated circuit as a switch press condition. This high current condition is converted into a high voltage condition which in turn can be detected by an on-chip analog-to-digital converter (ADC). The cell phone may, for example, interpret the switch press condition as a desire to pick up the call and respond accordingly.

When the cellular telephone is not being used to make a call, the integrated circuit is powered down into a low-power sleep state. This low power sleep state is maintained for a large proportion of time in order to reduce power consumption of the cellular telephone. Periodically, the cellular telephone momentarily wakes up into a higher power state to check to see if there is an incoming call. Presuming there is no call, the cellular telephone returns to the sleep state. In this way, the integrated circuit that includes the voltage regulator and the ADC is periodically powered up in order to check for an incoming call, but is otherwise kept in the low power sleep mode.

In order for the cellular telephone to detect a switch press condition, however, the MIC BIAS voltage regulator and the ADC must be powered and functional. The voltage regulator and ADC circuits are, however, not powered and not functional when the cellular telephone is in its low power sleep mode. Accordingly, if a switch detect operation is to be performed, then either there must be a wait period until the end of the current sleep mode cycle, or the integrated circuit must be powered up momentarily and periodically just to do switch detect operation.

For example, FIG. 2 shows a simplified diagram of a cellular telephone 201 that has a headset/microphone accessory 202 plugged into a jack 203 on the cellular telephone body. Voltage regulator 204 within analog integrated circuit 205 supplies a MIC BIAS voltage onto MIC BIAS terminal 206. This voltage biases the microphone of headset/microphone accessory 202. When pushbutton 207 is pressed, an unusually large current is drawn out of MIC BIAS terminal 206. This condition is detected using current mirror 208, resistor 209, and analog-to-digital converter (ADC) 210. When the voltage regulator, current mirror and ADC are unpowered in a low-power sleep mode of integrated circuit 205, the circuit of FIG. 2 cannot detect a switch press condition.

An alternative is desired whereby the switch detect operation can be carried out even when cellular telephone and the integrated circuit are in the low power sleep state.

SUMMARY

An integrated circuit within a cellular telephone is operable in a wake mode and in a sleep mode. In the wake mode, a voltage regulator supplies a regulated voltage onto a MIC BIAS terminal. This voltage biases a microphone of a headset/microphone accessory that is coupled to the cellular telephone. If the user closes a manually-operable switch (for example, presses a pushbutton) on the headset/microphone accessory, then an unusually large current is drawn out of the MIC BIAS terminal for an unusually large amount of time. This large current condition is detected as a switch press condition.

In the sleep mode, the voltage regulator is disabled to conserve power. Other circuitry (such as a current mirror and a housekeeper analog-to-digital converter) that is also conventionally used to detect a switch press condition during the wake mode is also disabled to conserve power. A novel low-power switch detect circuit supplies a current out of the MIC BIAS terminal. In the sleep mode, the voltage on the MIC BIAS terminal is not a regulated voltage. Under a given set of operating conditions, if the switch on the headset/microphone accessory is not pressed then a first amount of current is supplied out of the MIC BIAS terminal, whereas if the user presses the switch on the headset/microphone accessory then a larger amount of current is supplied out of the MIC BIAS terminal.

The current supplied out of the MIC BIAS terminal is mirrored within the low-power switch detect circuit such that a mirrored current flows across an on-chip resistor. The current being supplied out of the MIC BIAS terminal is therefore converted into a corresponding voltage. The voltage dropped across the on-chip resistor has a first voltage magnitude if the switch is not pressed. The voltage dropped across the on-chip resistor has a second higher voltage magnitude if the switch is pressed. A special inverter within the low-power switch detect circuit has an input switching threshold voltage that is between the first and second voltage magnitudes. If the voltage dropped across the on-chip resistor exceeds the input switching threshold voltage of the special inverter, then the special inverter outputs a digital signal whose digital value is indicative of the switch press condition. The special inverter of the low-power switch detect circuit is of such a construction that it has an input switching threshold voltage that is adequately located between the first and second voltage magnitudes over all desired temperature, voltage and process conditions.

In one embodiment, the digital signal is passed through a low-pass filter so that only switch press conditions of at least a certain duration will result in the digital signal having the digital value that is indicative of the switch press condition. The low-pass filter may include a discrete capacitor that is disposed on the printed circuit board of the cellular telephone but that is not being used in the sleep mode. An analog multiplexer of the low-power switch detect circuit couples this discrete capacitor into the low-pass filter in the sleep mode so that the discrete capacitor can function as part of the low-pass filter.

The novel low-power switch detect circuit therefore detects a switch press condition while the integrated circuit is in the sleep mode, and while the circuitry that is conventionally used to detect a switch press condition in the wake mode (the voltage regulator, the current mirror, and the housekeeper ADC) is disabled.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

DETAILED DESCRIPTION

Figure 1:
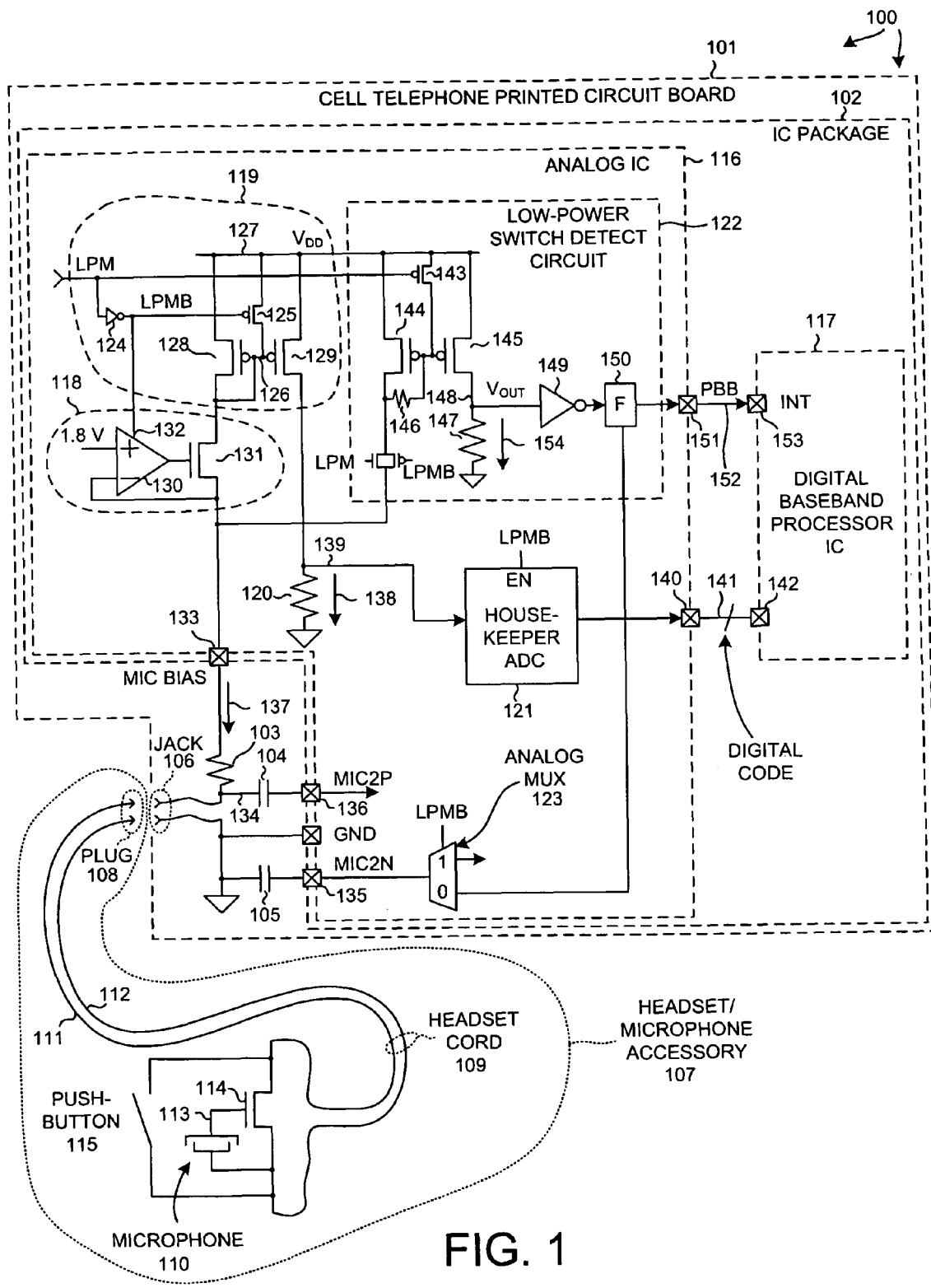
FIG. 1 is a simplified schematic diagram of a mobile communication device (for example, a cellular telephone) in accordance with one novel aspect.

FIG. 1 is a simplified schematic diagram of a mobile communication device 100 in accordance with one novel aspect. A printed circuit board 101 is disposed in the body of mobile communication device 100. An integrated circuit package 102 as well as a discrete resistor 103, two discrete capacitors 104 and 105 and an accessory connector 106 are disposed on printed circuit board 101. Connector 106 is provided so that an accessory such as a headset/microphone accessory 107 can be detachably coupled to mobile communication device 100.

In the example of FIG. 1, mobile communication device 100 is a cellular telephone and connector 106 is a jack. The cellular telephone can be used in a "hands free" fashion by plugging a plug 108 on the end of a cord 109 of the headset/microphone accessory 107 into jack 106. The cellular telephone 100 can drive signals over two connectors (not shown) in cord 109 to corresponding speakers (not shown) of the headset/microphone accessory 107 so that audio is emitted from the speakers. The speakers may emit audio to the user of the cellular telephone so that the user can listen to speech of another person in a cellular telephone conversation or so that the user can listen to music or other audio being output from the cellular telephone.

The user can also speak into a microphone 110 of the headset-microphone accessory 107. When the user speaks into microphone 110, the effective resistance between a microphone conductor 111 of cord 109 and a common ground conductor 112 of cord 109 varies. In one example, the microphone is of a type that involves a capacitive diaphragm. As the user speaks, air pressure waves in the user's voice press on the capacitive diaphragm and cause a distance between two plates of the microphone to change. For a given amount of charge on the plates, the voltage output onto node 113 changes. This voltage is supplied to the gate of a field effect transistor (FET) device 114, thereby changing the source-drain conductivity of the FET in relation to the air pressure experienced by the capacitive diaphragm. The drain of FET device 114 is coupled to microphone conductor 111 and the source of FET device 114 is coupled to ground conductor 112, so the changing source-drain FET conductivity is present between the two contacts of jack 106 when plug 108 is plugged into jack 106.

Headset/microphone accessory 107 also includes a manually-operable switch 115 that the user can operate. In the present example, the switch is a pushbutton. When the switch is not in the pressed state, then the switch is open. If, however, the user presses the switch, then the switch is closed. Because the switch is connected in parallel with FET device 114, the resistance between microphone conductor 111 and ground conductor 112 is zero ohms or very close to zero ohms if switch 115 is pressed. If switch 115 is not pressed, then the resistance between microphone conductor 111 and ground conductor 112 is the higher source-drain resistance of FET device 114 of the microphone.

In the present example, integrated circuit package 102 includes an amount of analog signal conditioning circuitry as well as a digital baseband processor. The analog signal conditioning circuitry is integrated onto an analog integrated circuit 116. The digital baseband processor circuitry is integrated onto a digital baseband processor integrated circuit 117. As illustrated in FIG. 1, both integrated circuits 116 and 117 are disposed in the same integrated circuit package 102 and may be referred to together as a Mobile Station Modem (MSM).

Cellular telephone 100 is operable in a higher power mode (referred to here as the "wake mode") or alternatively in a lower power mode (referred to here as the "sleep mode"). The sleep mode is sometimes referred to as the "standby mode". When the cellular telephone is in the wake mode, then a "low power mode" digital signal (LPM) has a digital low value. If, however, the cellular telephone is in the sleep mode, then the LPM signal has a digital high value. Other circuitry (not shown) within the cellular telephone asserts the LPM signal to put the analog integrated circuit 116 into the appropriate mode (i.e., either the wake mode or the sleep mode).

Wake Mode Operation:

In the wake mode, the user can use the cellular telephone to communicate in a cellular telephone call. The circuitry in the analog integrated circuit 116 is powered. The circuitry in integrated circuit 116 includes a voltage regulator 118, a current source circuit 119, a resistor 120, and a housekeeper analog-to-digital converter (ADC) 121. In addition, integrated circuit 116 includes a novel low-power switch detect circuit 122 that includes a novel analog multiplexer 123.

In the wake mode, current source circuit 119 is enabled because LPM is low. Inverter 124 therefore forces LPMB (low power mode "bar") to a digital high value. P-channel transistor 125 is therefore nonconductive. Node 126 of the current mirror is therefore not shorted to $V_{DD}$ supply conductor 127, but rather the two main P-channel transistors 128 and 129 of the current mirror are allowed to operate as a current mirror.

Differential amplifier 130 and N-channel transistor 131 together form voltage regulator 118. Signal LPMB is supplied to an enable input lead 132 of the differential amplifier. Because LPMB is a digital high, the differential amplifier is enabled. Voltage regulator 118 supplies a regulated 1.8 volt voltage onto terminal 133 of package 102. This voltage is often referred to as a "microphone bias voltage" or a MIC BIAS voltage. The MIC BIAS voltage is the bias voltage necessary the properly bias the microphone of the headset/microphone accessory 107. Terminal 133 is sometimes referred to as the "MIC BIAS" terminal. Discrete resistor 103 and the resistance of the headset/microphone accessory 107 between conductors 111 and 112 of cord 109 together form a resistive voltage divider. As the resistance of the headset/microphone accessory 107 changes, the resistance between conductors 111 and 112 changes and the voltage on the center node 134 of the voltage divider changes.

In the wake mode, the low power mode (LPM) signal is a digital low. The LPMB signal that is supplied to the select input lead of analog multiplexer 123 is therefore a digital high. The MIC2N terminal 135 is therefore coupled through analog multiplexer 123 to one input lead of a differential amplifier (not shown). The differential amplifier amplifies and buffers the audio input signal from the microphone. The MIC2P terminal 136 is coupled to the other input lead of the differential amplifier. When the user speaks into the microphone, the voltage present between the MIC2N and MIC2P terminals 135 and 136, respectively, is the audio input signal that is received by the differential amplifier into analog integrated circuit 116.

When the cellular telephone is being used in hands free fashion in the wake mode, the user may be speaking into the microphone in order to communicate with another participant of the telephone call. In one example where the $V_{DD}$ supply voltage is 2.7 volts and where the resistance of discrete resistor 103 is 2.2 k ohms, the current 137 flowing out of MIC BIAS terminal 133 has a maximum DC magnitude of 360 microamperes over temperature.

When the cellular telephone is being used in hands free fashion in the wake mode, the user may wish to press pushbutton 115. The pressing of pushbutton 115 is detected by the cellular telephone and is interpreted as a command to perform a predetermined function. Generally, the function depends on the operating mode of the cellular telephone when the switch press event occurs. If, for example, the user is participating in a call and the user presses pushbutton 115, then the cellular telephone interprets the switch press as a command to terminate the call. If, for example, the cellular telephone is ringing and the user presses pushbutton 115, then the cellular telephone interprets the switch press as a command to pickup the call. In the example of FIG. 1, when pushbutton 115 is pressed, pushbutton 115 effectively shorts out the microphone and the resistance between conductors 111 and 112 of cord 109 falls to approximately zero ohms. The total resistance between MIC BIAS terminal 133 and ground potential falls to 2.2 k ohms. Current 137 flowing out of MIC BIAS terminal 133 during the switch press event is approximately twice the current flow in a non-switch press condition.

The differential between the non-switch press condition current and the switch press condition current is detected as follows. Current mirror 119 has two legs. The first leg is the drain of P-channel transistor 128. The second leg is the drain of P-channel transistor 129. Transistor 128 is sized to be approximately four times as large as transistor 129. Current 137 is mirrored through the first leg of current mirror 119. Due to the operation of current mirror 119, a mirrored current 138 that is approximately one fourth as large as current 137 is supplied out of the second leg of the current mirror. This current 138 is conducted over resistor 120 to convert the current into a corresponding voltage on node 139. The voltage on node 139 during a switch press condition is therefore roughly twice the voltage that is on node 139 in a non-switch press condition. Housekeeper ADC 121 performs A/D conversions approximately eight times a second to determine if there is a major change in the voltage on node 139. If a major change is detected, then housekeeper ADC 121 forwards an indication of the switch press condition to the digital baseband processor integrated circuit 117. The indication of the switch press condition is forwarded in the form of a digital code that is communicated through terminals 140, across a special parallel interface 141, and to terminals 142 of digital baseband processor integrated circuit 117. How the digital baseband processor integrated circuit 117 uses the switch press information is implementation specific. As described above, the switch press information may be interpreted as a command to pick up a call or to terminate a call.

In the wake mode described above, the novel low-power switch detect circuit 122 is disabled. Low power mode signal LPM is a digital low. P-channel transistor 143 is therefore conductive, and the gates of P-channel transistors 144 and 145 of a current mirror are coupled to $V_{DD}$ supply voltage conductor 127. P-channel transistors 144 and 145 and resistor 146 form a current mirror. This current mirror is disabled due to the gates of transistors 144 and 145 being coupled to $V_{DD}$ supply voltage conductor 127. Transistor 145 is nonconductive, no current flows over resistor 147, and the output voltage $V_{OUT}$ on node 148 is a digital low. Inverter 149 outputs a digital high. The digital high signal passes through a non-inverter low-pass filter 150 such that a digital high signal (push button "bar" or PBB) is present on terminal 151. The digital high signal is communicated across a conductor 152 to terminal 153 of the digital baseband processor integrated circuit 117. The digital baseband processor integrated circuit 117 ignores the signal on terminal 153 during the wake mode because the low-power switch detect circuit is disabled.

Figure 2:
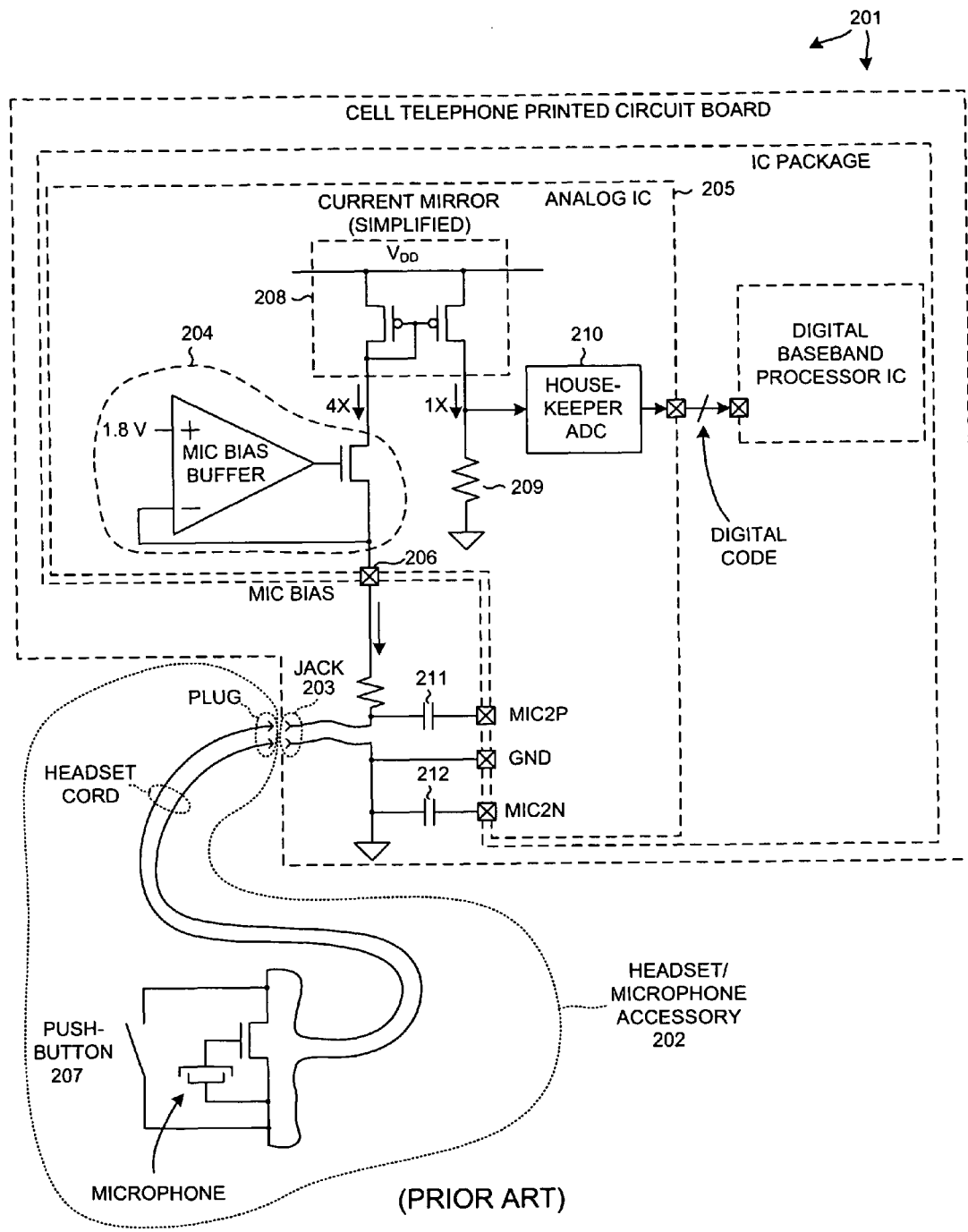
FIG. 2 (Prior Art) is a simplified diagram of a cellular phone.

Sleep Mode Operation:

In the sleep mode, voltage regulator 118, current mirror 119 and housekeeper ADC 121 are disabled in order to reduce current consumption. During sleep mode, the voltage on MIC BIAS terminal 133 is not a regulated voltage. In one novel aspect, analog integrated circuit 116 is able to detect a switch press condition in the sleep mode. In the example of FIG. 1, the switch press condition is detected despite the fact that voltage regulator 118, current mirror 119 and housekeeper ADC 121 are disabled. Whereas in the conventional circuitry of FIG. 2 the entire analog integrated circuit 205 may have to be taken out of sleep mode operation at periodic intervals just so that that condition of pushbutton switch 207 can be monitored when cellular telephone 201 is not in active use, the analog integrated circuit 116 of FIG. 1 can detect a pushbutton press condition while in the sleep mode without having to power up the voltage regulator 118, the current mirror 119 and the housekeeper ADC 121.

In the sleep mode, the LPM signal is a digital high, and the LPMB signal is a digital low. The LPMB signal is supplied to P-channel transistor 125 of current mirror 119. P-channel transistor 125 is conductive, thereby coupling node 126 to $V_{DD}$ supply conductor 127 and disabling current mirror 119. P-channel transistor 129 is nonconductive, and there is no current flow over resistor 120. Signal LPMB is supplied to the enable input lead of housekeeper ADC 121. The housekeeper ADC 121 is therefore similarly disabled. The LPMB signal is supplied to the enable input lead of differential amplifier 132 of the voltage regulator 118. The voltage regulator 118 is therefore disabled. Transistor 131 of voltage regulator 118 is nonconductive.

Low-power switch detect circuit 122 is, however, enabled because signal LPM is a digital high. P-channel transistor 143 is nonconductive and is not coupling the gates of transistors 144 and 145 to $V_{DD}$ supply conductor 127. The current mirror (including transistors 144 and 145 and resistor 146) is enabled. The current mirror has two legs. The first leg is the drain of transistor 144. The second leg is the drain of transistor 145. Current 137 that flows out of MIC BIAS terminal 133 is now supplied from the first leg of the current mirror within low-power switch detect circuit 122. This magnitude of this current 137 in the sleep mode, as explained in further detail below, varies depending on the temperature, supply voltage, process. Current 137 flows across resistor 103 and through the headset/microphone accessory 107, and to ground potential. Under a given set of temperature, supply voltage, and process conditions, the current 137 increases if pushbutton 115 is pressed. The current 137, which flows out of the first leg of the current mirror of low-power switch detect circuit 122, is mirrored so that a mirrored current 154 flows out of the second leg of the current mirror and across resistor 147 to ground potential. Current 154 is converted by resistor 147 into a corresponding voltage $V_{OUT}$ on node 148. Accordingly, under a given set of temperature, supply voltage, and process conditions, the voltage $V_{OUT}$ increases if pushbutton 115 is pressed. The input switching threshold voltage of inverter 149 is between the voltage on node 148 in the condition when the pushbutton 115 is not pressed and the voltage on node 148 when the pushbutton 115 is pressed. The output of inverter 149 therefore is a digital low if pushbutton 115 is pressed and is a digital high is pushbutton 115 is not pressed. The digital signal output from inverter 149 passes through non-inverting low-pass filter 150 and onto terminal 151.

Figure 3:
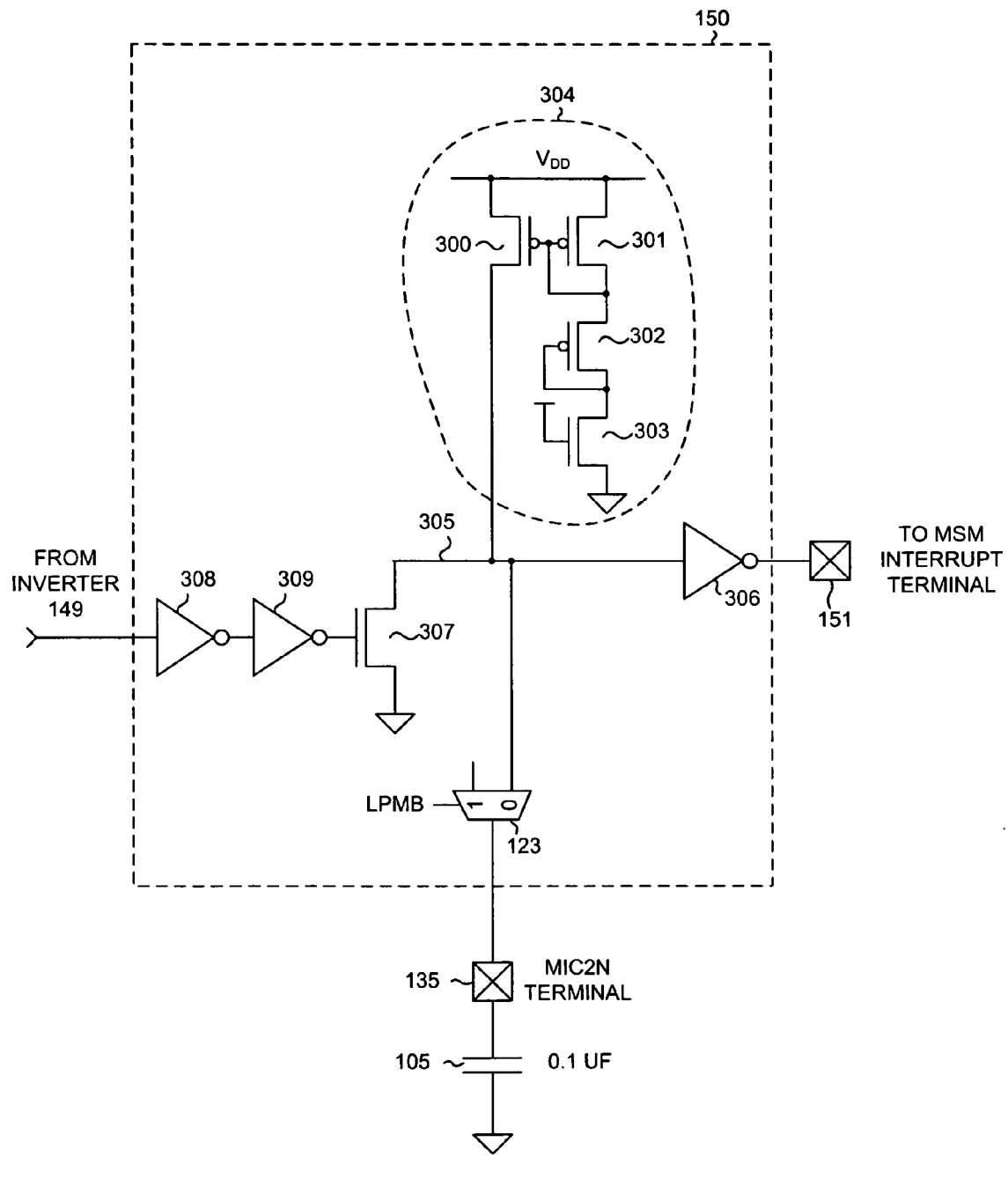
FIG. 3 is a diagram of filter 150 of the low-power switch detect circuit 122 of FIG. 1.

FIG. 3 is a circuit diagram of non-inverting low-pass filter 150. Transistors 300-303 form a weak pullup circuit 304 that is capable of charging node 305 from ground potential up to the threshold voltage of inverter 306 within several hundred milliseconds, assuming that N-channel transistor 307 is nonconductive and assuming that analog multiplexer 123 couples the MIC2N terminal 135 to node 305 in the low power sleep mode. The capacitance of the filter is provided by the 0.1 microfarad external capacitor 105. Capacitor 105 is one of two blocking capacitors 105 and 104 that are used to couple the conductors 111 and 112 of headset/microphone accessory 107 to input terminals MIC2P and MIC2N so that the microphone audio signal can pass into analog integrated circuit 116. In the conventional circuit of FIG. 2, the blocking capacitors 211 and 212 are not used in the sleep mode. In the circuit of FIG. 1, however, signal LPMB is a digital low and is supplied to the select input lead of analog multiplexer 123. Analog multiplexer 123 therefore couples MIC2N terminal 135 to the remainder of the RC filter 150 so that capacitor 105 functions as the capacitor of the filter 150.

If pushbutton 115 is pressed, then voltage $V_{OUT}$ on node 148 rises to an unusually large voltage for an unusually large amount of time as explained above. An unusually large amount of time in this example is more than approximately two hundred milliseconds. Inverter 149 (see FIG. 1) outputs a digital low value. The transistors within CMOS inverter 308 are sized such that inverter 308 has a low input switching threshold voltage of approximately 0.9 volts. Inverter 308 outputs a digital high, and inverter 309 outputs a digital low. A digital logic low is therefore on the gate of N-channel transistor 307 and N-channel transistor 307 is nonconductive. If this condition persists, then weak pullup circuit 304 charges node 305 from ground potential up to the input switching threshold voltage of inverter 306. The input switching threshold voltage of inverter 306 is about 1.8 volts. Inverter 306 outputs a digital logic low onto terminal 151. The filtered digital low logic level signal on terminal 151 passes over conductor 152 to terminal 153 of digital baseband processor integrated circuit 117. Accordingly, if a pushbutton press occurs in the sleep mode, then the "push button bar" signal (PBB) present on terminal 151 has a digital low value, otherwise in the sleep mode the PBB digital signal on terminal 151 has a digital high value. In one example, terminal 153 of digital baseband processor integrated circuit 117 is an edge sensitive interrupt input terminal.

If pushbutton 115 is not pressed for a long enough time, then N-channel pulldown transistor 307 is made conductive again before the voltage on the input lead of inverter 306 reaches the input switching threshold voltage of inverter 306. N-channel transistor 307 overcomes the weak pullup circuit 304 and discharges capacitor 105 such that node 305 is again grounded. Because N-channel transistor 307 was not nonconductive long enough to allow node 305 to charge up to the threshold voltage of inverter 306, inverter 306 never switches and terminal 150 is never driven with a digital logic low signal. Where terminal 151 is coupled to an edge sensitive interrupt input terminal of the digital baseband processor integrated circuit 117, no interrupt condition is generated.

Inverter 149:

In the description above of low-power switch detect circuit 122, a given set of temperature, supply voltage, and process conditions was assumed, and it was stated that inverter 149 had an input switching threshold between the voltage on node 148 in the condition when the pushbutton 115 is not pressed and the voltage on node 148 when the pushbutton 115 is pressed. The circuit of FIG. 1 is, however, not just to operate properly under one set of temperature, supply voltage, and process conditions. The circuit is to operate properly over a temperature range of from minus 20 degrees Celsius to plus 40 degrees Celsius, over a $V_{DD}$ supply voltage range of from 2.5 volts to 2.7 volts, and over ordinary semiconductor manufacturing process variations from SLOW to FAST. Realizing inverter 149 as an ordinary complementary metal oxide semiconductor (CMOS) logic inverter may not work satisfactorily over these temperature, supply voltage, and process variation ranges because the voltages developed across resistor 147 in the press and non-press conditions vary over temperature, voltage and process in a way that the threshold voltage of the ordinary logic inverter will not be adequately located between the press and non-press voltages under all operating conditions. The variations in the press and non-press voltages over temperature, voltage and process are due to numerous factors including the variations in threshold voltages of transistors 144 and 145 and including changes in the resistance of resistor 147. Resistor 147 is an on-chip polysilicon resistor of a nominal resistance of 10 k ohms, but the actual resistance of resistor 147 varies considerably over process in a range of from approximately 7.6 k ohms to approximately 12.6 k ohms. To design a suitable inverter 149, the voltage developed across resistor 147 is derived.

The equation for saturation current in a PMOS device which is connected as a diode-connected transistor in a current mirror and with the drain of the PMOS device connected to ground through an off-chip resistor R is:

$$I = \frac{1}{2}\frac{W}{L}\mu_p C_{ox}(V_{SG} - V_{TP})^2 \quad \text{(Eq. 1)}$$
$$= K(V_{DD} - IR - V_{TP})^2$$
$$= K(V_{EFF} - IR)^2$$

$V_{SG}$ is the source-to-gate voltage. $V_{TP}$ is the threshold voltage of a P-channel transistor. K is $(W\mu_p C_{ox})/2L$. Evaluating the right hand side of the equation yields:

$$I = K(I^2R^2 - 2IRV_{EFF} + V_{EFF}^2) \quad \text{(Eq. 2)}$$

Dividing both sides by K and subtracting I/K from both sides yields:

$$0 = \left(R^2 I^2 - \left(2RV_{EFF} + \frac{1}{K}\right)I + V_{EFF}^2\right) \quad \text{(Eq. 3)}$$

Using the quadratic equation where $a=R^2$, $b=-(2RV_{EFF}+1/K)$, $c=(V_{EFF})^2$ yields (the minus sign from the +/- is chosen based on simulation observations):

$$I = \frac{-b \pm \sqrt{b^2 - 4ac}}{2a} \quad \text{(Eq. 4)}$$

$$= \frac{2RV_{EFF} + \frac{1}{K} - \sqrt{4R^2 V_{EFF}^2 + \frac{4RV_{EFF}}{K} + \frac{1}{K^2} - 4R^2 V_{EFF}^2}}{2R^2}$$

The term 1/K is negligible if the P-channel transistor 145 has a large enough ratio of width to length (i.e. W/L). Skipping a few algebraic steps yields:

$$I = \frac{V_{EFF}}{R} - \frac{\sqrt{\frac{V_{EFF}}{RK}}}{R} \quad \text{(Eq. 5)}$$
$$= \frac{V_{DD} - V_{TP}}{R} - \frac{\sqrt{\frac{V_{DD} - V_{TP}}{RK}}}{R}$$

Assuming that the R in the previous equations used for this operation is off-chip, and the current I is passed through $R_{ONCHIP}$ to develop an on-chip voltage $V_{OUT}$ used for comparison, then the voltage $V_{OUT}$ on node 148 is the following:

$$V_{OUT} = R_{ONCHIP}\left(\frac{V_{DD} - V_{TP}}{R_{OFFCHIP}} - \frac{\sqrt{\frac{V_{DD} - V_{TP}}{R_{OFFCHIP} K}}}{R_{OFFCHIP}}\right) \quad \text{(Eq. 6)}$$

$R_{ONCHIP}$ is the resistance of resistor 147. $R_{OFFCHIP}$ is the resistance of resistor 103. From equation Eq. 6, a clear dependence is evident between the voltage $V_{OUT}$ (the voltage on node 148) and MOS process corner, temperature and variations in the resistance of resistor 147 ($R_{ONCHIP}$). In a first extreme of operation (−40 degrees C., fast resistor, slow MOS process), the voltage $V_{OUT}$ on node 148 is approximately 0.6-0.7 volts when pushbutton 115 is not pressed and is approximately 1.3 volts when the pushbutton 115 is pressed. In a second extreme of operation (20 degrees C., slow resistor, fast MOS process), the voltage $V_{OUT}$ on node 148 when pushbutton 115 is not pressed is approximately 1.0-1.4 volts and is approximately 2.3 volts when pushbutton 115 is pressed. If 1.4 volts is used for the non-press voltage in the second extreme, then the two press/non-press voltage ranges do not overlap. Given that most of the variation of $V_{OUT}$ in equation Eq. 6 is due to variations in the resistance of on-chip resistor 147, and given that the threshold of an ordinary CMOS inverter does not track with changes in the resistance of the on-chip resistor, an ordinary CMOS logic inverter would likely not be able to discern a pushbutton press condition from a low resistance condition of FET 114 (for example, due to high amplitude pressure waves being received onto the microphone) over process corner.

Figures 4, 5:
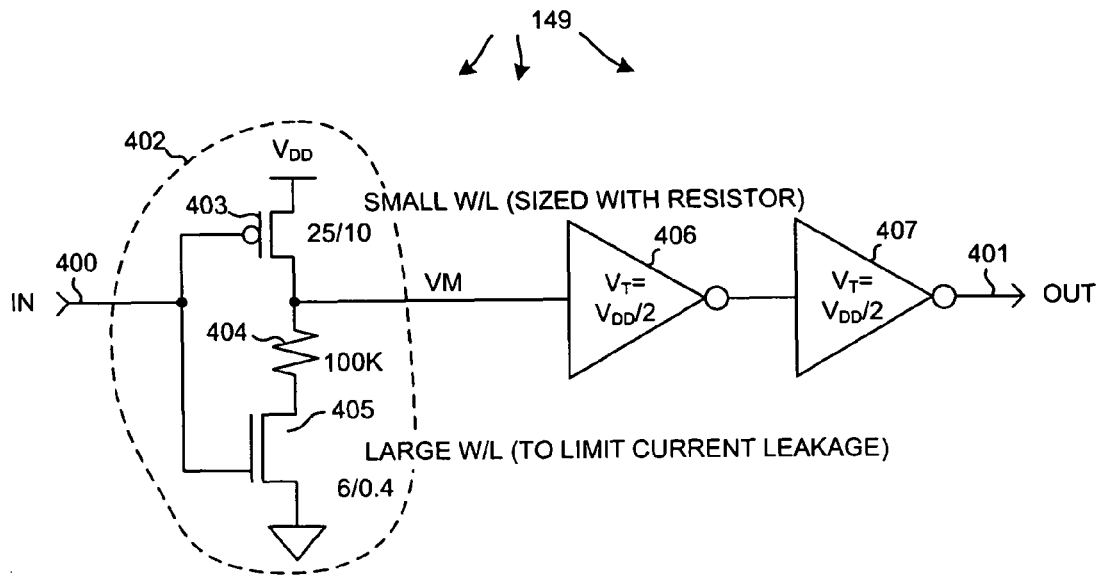
FIG. 4 is a diagram of inverter 149 of the low-power switch detect circuit 122 of FIG. 1.
FIG. 5 is a table that illustrates how the input switching threshold voltage of inverter 149 is adequately located between the $V_{OUT}$ voltage when pushbutton 115 is pressed and the $V_{OUT}$ voltage when pushbutton 115 is not pressed.

FIG. 4 is a schematic diagram of one example of inverter 149 of FIG. 1. Node 400 is the input lead of inverter 149. Node 401 is the output lead of inverter 149. The first stage 402 includes a P-channel pullup transistor 403, a polysilicon resistor 404, and an N-channel pulldown transistor 405. The second stage 406 and the third stage 407 are ordinary CMOS logic inverters whose switching threshold voltages are set at $V_{DD}/2$. The second and third stages are provided to sharpen the switching characteristic of the overall inverter 149. The first stage 402 of inverter 149 has an input switching threshold voltage $V_T$ that increases as the resistance of resistor 147 of FIG. 1 increases. The input switching threshold voltage $V_T$ is derived as follows.

The threshold voltage of inverter 149 is set to be the voltage across resistor 147 that makes the voltage $V_M$ that is output by the first stage 402 in FIG. 4 equal to $V_{DD}/2$. Deriving this voltage:

$$V_M = I_{PMOS} R_{ONCHIP} \quad \text{(Eq. 7)}$$

$V_M$ is set to be $V_{DD}/2$:

$$\frac{V_{DD}}{2} = \frac{K}{2}(V_{DD} - V_{TP} - V_T) R_{ONCHIP} \quad \text{(Eq. 8)}$$

Solving for $V_T$ (the input switching threshold voltage of inverter 149 of FIG. 1) yields:

$$V_T = (V_{DD} - V_{TP}) - \sqrt{\frac{V_{DD}}{KR_{ONCHIP}}} \quad \text{(Eq. 9)}$$

Equation Eq. 9 indicates that the variation of $V_T$ due to variations in $R_{ONCHIP}$ (the resistance of resistor 147) is approximately 150 millivolts. This variation is a variation about the nominal $V_T$ of 1.4 volts. Under otherwise nominal TVP conditions, as $R_{ONCHIP}$ increases from a nominal value of 10 k ohms to a resistance of 12.6 k ohms, the input switching threshold voltage $V_T$ of inverter 149 increases slightly from a nominal $V_T$ of approximately 1.55 volts to a $V_T$ of approximately 1.61 volts. From equation Eq. 9, it is also seen that the input switching threshold voltage $V_T$ tracks to some degree with $V_{TP}$ and K. As $V_{TP}$ increases, $V_T$ decreases. As K increases, $V_T$ increases. In addition, as $V_{DD}$ increases, $V_T$ and $V_{OUT}$ track quite closely with each other. The relationship of equation Eq. 9, however, is a simplification. More accurate characterizations of the changes in $V_T$ with temperature, voltage and process are made by using a circuit simulation program (for example, SPICE) and/or by manufacturing the circuit and then testing its performance under different operating conditions.

FIG. 5 is a table that illustrates the input switching threshold voltage $V_T$ of inverter 149 under one extreme of TVP conditions, under one set of nominal TVP conditions, and under another extreme of TVP conditions. The optimal threshold voltage is 0.47 volts higher (1.71 volts-1.24 volts) in extreme condition two than in extreme condition one. The actual input switching threshold voltage $V_T$ is 0.14 volts higher (1.52 volts-1.38 volts) in extreme condition two than in extreme condition one.

The sizing of the components in the specific embodiment of FIG. 1 may be conducted as set forth in items one through nine set forth below.

1) The maximum current through the microphone when pushbutton 115 is not pressed is determined by experiment. This value was 360 microamperes in the embodiment of FIG. 1.

2) Next, the maximum possible magnitude of current 137 when pushbutton 115 is pressed is determined. The resistance of pushbutton 115 is assumed to be zero ohms. The maximum possible current 137 when the pushbutton is pressed may be approximated to be the maximum $V_{DD}$ supply voltage divided by the resistance of resistor 103. Where $V_{DD}$ varies from 2.5 volts to 2.7 volts, and the resistance of external discrete resistor 103 is 2.2 k ohms, the maximum current 137 when pushbutton 115 is pressed is approximately 1.136 milliamperes.

3) The simplification of item two is not, however, entirely accurate because there is a diode-connected P-channel transistor 144 in the current path between the $V_{DD}$ supply conductor 127 and resistor 103. In addition, there may be an additional on-chip switch and routing resistance between diode-connected P-channel transistor 144 and resistor 103 depending on details of the implementation. Diode-connected P-channel transistor 144 typically has a voltage drop of $V_{GS}=V_{TP}+100$ mV, where $V_{GS}$ is the gate-to-source voltage, and where $V_{TP}$ is the threshold voltage of the P-channel transistor 144. The resultant maximum current 137 (when pushbutton 115 is pressed) is then given by $(V_{DD}-V_{GS})/2.5$ k ohms. The 2.5 k ohms is a combination of the 2.2 k ohms of resistor 103 and an additional 300 ohms that is included in the calculation to account for additional on-chip resistance. The maximum current 137 when pushbutton 115 is pressed is therefore approximately 840 microamperes for 2.7 volts $V_{DD}$ supply voltage. This current is about twice the maximum current determined by experiment in item one when pushbutton 115 is not pressed.

Diode-connected P-channel transistor 144 is then sized to be as large as possible so as to minimize excess voltage $V_{GS}-V_T$. The mirroring P-channel transistor 145 is sized to be four times smaller than transistor 144 in order to reduce current consumption while still maintaining good matching properties with transistor 144.

Resistor 147 is sized such that the voltage on node 148 when pushbutton 115 is pressed is at most $V_{DD}-0.1$ volts over process corner and temperature. This maximizes the spacing between the voltage on node 148 during a condition when the pushbutton is pressed and a condition when the pushbutton is not pressed. Recall that the maximum current when the pushbutton is pressed is approximately twice the current when the pushbutton is not pressed. Thus, the absolute difference between the two levels is maximized when the maximum current when the pushbutton is pressed is maximized.

6) After P-channel transistors 144 and 145 have been sized, and after resistor 147 has been sized, then the circuit is simulated at the typical (nominal) temperature, voltage, and process condition. The voltage on node 148 is determined by simulation when pushbutton 115 is pressed and when it is not pressed. The voltage halfway between the two voltages is determined to be the optimal input switching threshold voltage of inverter 149 for the nominal corner.

7) Resistor 404 is sized to have a somewhat high resistance and also so that its resistance is an integer multiple of the resistance of resistor 147. This guarantees good matching properties between the two resistors 404 and 147. In the example of FIG. 4, resistor 147 has a resistance of approximately 100 k ohms.

8) The width and length dimensions of N-channel transistor 405 are chosen such that leakage current through the N-channel transistor 405 will be limited but such that the properties of the N-channel transistor 405 do not affect the threshold voltage of inverter 149. In the example of FIG. 4, N-channel transistor 405 has a width of 6 microns and a length of 0.4 microns.

9) The ratio of width to length of P-channel transistor 403 are determined such that the input switching threshold voltage determined in item six above is obtained under the typical temperature, voltage and process conditions. The length of P-channel transistor 403 is chosen to be large such that the transistor experiences minimal absolute variations due to lithography errors. In the example of FIG. 4, P-channel transistor 403 has a width of 25 microns and a length of 10 microns.

Figure 6:
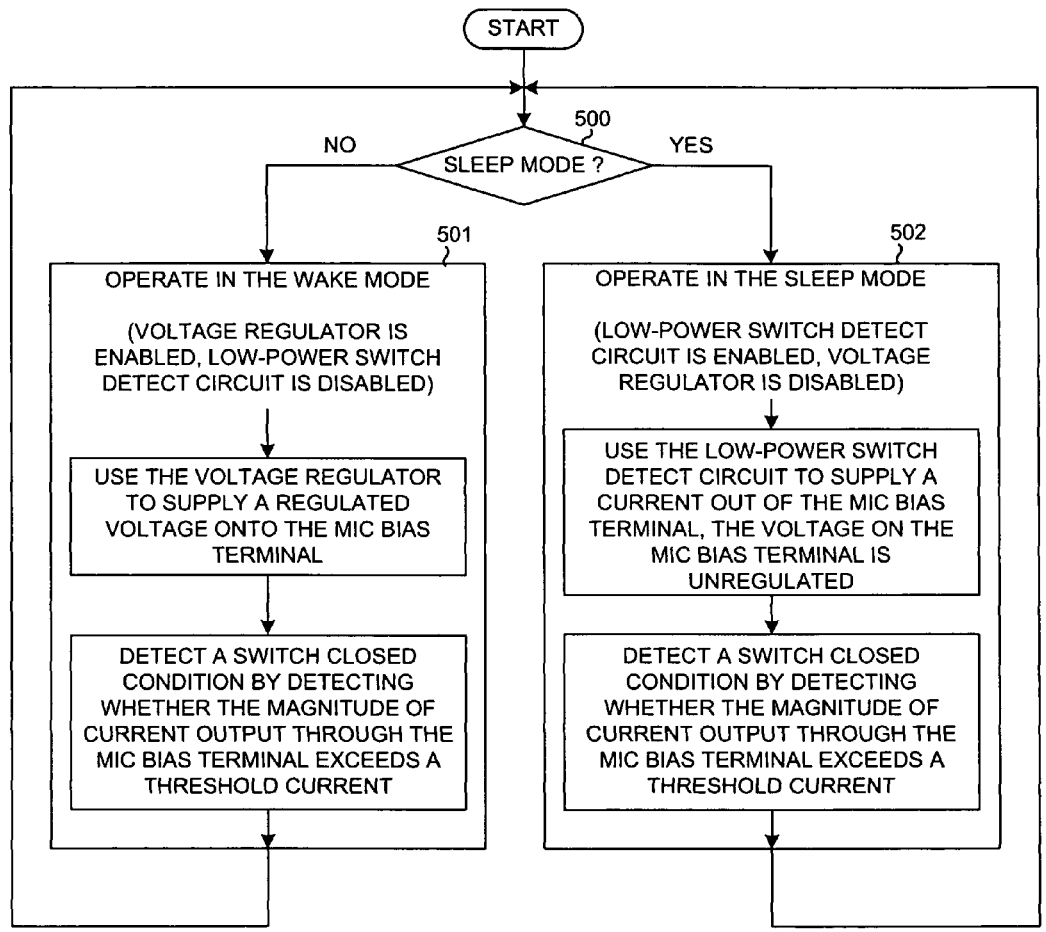
FIG. 6 is a simplified flowchart diagram that illustrates a method in accordance with one novel aspect.

FIG. 6 is a simplified flowchart that illustrates a method in accordance with one novel aspect. Diamond 500 represents the action of placing analog integrated circuit 116 into either the low power sleep mode (a first operating mode) or into a higher power wake mode (a second operating mode). In the embodiment of FIG. 1, digital signal LPM is asserted to a digital logic high value to put analog integrated circuit 116 into the sleep mode, whereas signal LPM is desasserted to a digital logic low value to put analog integrated circuit 116 into the wake mode.

Block 501 indicates that in the wake mode (the second operating mode), the voltage regulator 118 of integrated circuit 116 is enabled and is used to supply a regulated voltage onto MIC BIAS terminal 133. If switch 115 is closed, then the magnitude of the current flow out of MIC BIAS terminal 133 exceeds a threshold current and the voltage on node 139 exceeds a corresponding threshold voltage. In the specific circuit of FIG. 1, this switch-closed condition is detected by housekeeper ADC 121, and a digital code indicative of the switch-closed condition is output from analog integrated circuit 116 to digital baseband processor integrated circuit 117 via terminals 140.

Block 502 indicates that in the sleep mode (the first operating mode), the voltage regulator 118 is disabled. Low-power switch detect circuit 122 is enabled and supplies a current in a current path out of the integrated circuit through the MIC BIAS terminal 133 as described above. The voltage on MIC BIAS terminal 133 is unregulated. If switch 115 is closed, then the current exceeds a threshold current. The low-power switch detect circuit 122 generates a digital signal that has a first digital value if the current exceeds the threshold current and that has a second digital value if the current does not exceed the threshold current. In the specific circuit of FIG. 1, the "push button bar" PBB digital signal is output from analog integrated circuit 116 to digital baseband processor integrated circuit 117 via terminal 151. Integrated circuit 116 therefore detects and reports the switch-closed condition while integrated circuit 116 is in the low power sleep mode, and integrated circuit 116 does this without any of the voltage regulator 118, and/or the current source 119, and/or the housekeeper ADC 121 being enabled.

Although certain specific embodiments are described above for instructional purposes, the teachings of this patent document have general applicability and are not limited to the specific embodiments described above. Accordingly, various modifications, adaptations, and combinations of the various features of the described specific embodiments can be practiced without departing from the scope of the claims that are set forth below.

What is claimed is:

1. A method, comprising:
   (a) in a second operating mode of a circuit, using a voltage regulator to supply a regulated voltage onto a microphone bias (MIC BIAS) terminal of the circuit;
   (b) in a first operating mode of the circuit, maintaining the voltage regulator in a disabled state and supplying, using a first current mirror having a first leg coupled to the MIC BIAS terminal and a second leg, a first current in a current path out of the circuit through the MIC BIAS terminal; and
   (c) in the first operating mode of the circuit, mirroring the first current using the current mirror to generate a first mirrored current at the second leg, receiving, by a resistor and an inverter, the first mirrored current, and generating a digital signal based on a level of the first mirrored current, wherein the digital signal has a first digital value if the first mirrored current exceeds a threshold current, and wherein the digital signal has a second digital value if the first mirrored current does not exceed the threshold current.

2. The method of claim 1, wherein the second operating mode is a wake mode, and wherein the first operating mode is a sleep mode.

3. The method of claim 1, wherein the second leg of the first current mirror is coupled to the resistor and to an input lead of the inverter, wherein the first mirrored current flows across the resistor to generate a first voltage, the first voltage being indicative of a magnitude of the first current flowing through the MIC BIAS terminal, wherein the first voltage is present on the input lead of the inverter.

4. The method of claim 1, wherein the voltage regulator is enabled in the second operating mode and is disabled in the first operating mode, and wherein the first current is supplied in (b) out of the circuit in the first operating mode and is not supplied out of the circuit in the second operating mode.

5. The method of claim 1, wherein there is a voltage on the microphone bias (MIC BIAS) terminal of the circuit when the first current is flowing in the current path in (b), and wherein the voltage is an unregulated voltage.

6. The method of claim 1, further comprising:
   in the second operating mode, generating a multi-bit digital value indicative of a magnitude of a second current flowing out of the MIC BIAS terminal when the voltage regulator is enabled, wherein the generating of the multi-bit digital value comprises:
      mirroring the second current across a second resistor such that a second mirrored current flows across the second resistor to generate a second voltage; and
      using an analog-to-digital converter (ADC) to convert the second voltage into the multi-bit digital value, wherein the second resistor and the ADC are parts of the circuit.

7. The method of claim 1, wherein the circuit is a part of a cellular telephone.

8. The method of claim 1, further comprising:
   coupling a first conductor of a microphone accessory to the MIC BIAS terminal of the circuit via a resistor, wherein the microphone accessory further includes a second conductor and manually-operable switch;
   coupling the second conductor of the microphone accessory to another terminal of the circuit; and
   detecting a pressing of the manually-operable switch in the first operating mode and in response to said detecting generating the digital signal in (c) such that the digital signal has the first digital value.

9. The method of claim 1, wherein the circuit is adapted to detect a pressing of a manually-operable switch on a microphone accessory when the microphone accessory is coupled to the circuit and when the circuit is operating in the first operating mode.

10. The method of claim 3, wherein the first resistor has a resistance, and wherein the inverter has an input switching threshold voltage that tracks with the resistance of the first resistor.

11. The method of claim 1, further comprising:
    in the second operating mode using a capacitor to AC couple a microphone accessory to a terminal of the circuit, the capacitor not being part of the circuit; and
    in the first operating mode using the capacitor as part of a low-pass filter, the low-pass filter functioning in the first operating mode to low-pass filter the digital signal.

12. A circuit comprising:
    a terminal;
    a voltage regulator connected to the terminal that is disabled in a first operating mode and that is enabled in a second operating mode, wherein when the voltage regulator is enabled it supplies a regulated voltage onto the terminal; and
    a low-power switch detect circuit comprising a current mirror, a resistor, and an inverter, wherein the current mirror comprises a first leg and a second leg, wherein the first leg is connected to the terminal, wherein in the first operating mode the low-power switch detect circuit supplies a current through the first leg that flows out of the circuit through the terminal and supplies a mirrored current through the second leg to the resistor and the inverter,
    wherein the low-power switch detect circuit is configured to:
      detect whether the mirrored current through the second leg exceeds a threshold current;
      output a first digital logic value if the low-power switch detect circuit detects that the mirrored current through the second leg exceeds the threshold current; and
      output a second digital logic value if the low-power switch detect circuit detects that the mirrored current through the second leg does not exceed the threshold current wherein when the current flows out of the circuit in the first operating mode there is an unregulated voltage on the terminal.

13. The circuit of claim 12, wherein the resistor is coupled to the second leg such that the mirrored current flows through the resistor; and
    wherein the inverter comprises an input lead coupled to the second leg of the current mirror and to the resistor.

14. The circuit of claim 13, wherein the low-power switch detect circuit further comprises:
    a voltage detection circuit having an input lead, the input lead being coupled to the resistor.

15. The circuit of claim 14, wherein the low-power switch detect circuit further comprises:
a low-pass filter having an input lead and an output lead, the input lead of the low-pass filter being coupled to an output lead of the voltage detection circuit.

16. The circuit of claim 12, wherein the terminal, the voltage regulator, and the low-power switch detect circuit are parts of an integrated circuit.

17. The circuit of claim 16, wherein the first operating mode is a sleep mode, wherein the circuit is part of a communication device, the communication device including a manually-operable switch, and wherein the low-power switch detect circuit detects a condition when the manually-operable switch is closed in the sleep mode.

18. The circuit of claim 17, wherein the circuit includes other circuitry, the other circuitry detecting a condition when the manually-operable switch is closed in the second operating mode.

19. A circuit adapted for coupling to a microphone assembly, the microphone assembly including a microphone, a manually-operable switch, and a conductor, the circuit comprising:
a terminal that is detachably couple to the conductor of the microphone assembly;
means for supplying a regulated voltage onto the terminal in a second operating mode and for detecting a condition in the second operating mode when the switch of the microphone assembly is closed;
means for supplying a current onto the terminal in a first operating mode such that a voltage on the terminal is an unregulated voltage, and for detecting a condition in the first operating mode when the switch on the microphone assembly is closed; and
wherein the means for supplying the current onto the terminal comprises a current mirror, an resistor, and an inverter, wherein the current mirror comprises a first leg and a second leg, wherein the current minor supplies the current onto the terminal through the first leg, and wherein the current mirror supplies a mirrored current onto the second leg and to the resistor and the inverter for detecting the condition.

20. The circuit of claim 19, wherein the terminal, the means for supplying the regulated voltage in the second operating mode, and the means for supplying the current in the first operating mode are parts of an integrated circuit.

21. The circuit of claim 19, wherein the second operating mode is a wake mode, and wherein the first operating mode is a sleep mode.

22. The circuit of claim 19, wherein the regulated voltage is a voltage that biases the microphone of the microphone assembly.

23. The method of claim 1, wherein, in the first operating mode of the circuit, generating a digital signal comprises generating a continuous digital signal, wherein the continuous digital signal has a first digital value if the first current exceeds a threshold current, and wherein the digital signal has a second digital value if the first current does not exceed the threshold current.

24. An apparatus configured to be connected to a terminal having an unregulated voltage thereon in a first operating mode, and to a voltage regulator that is disabled in the first operating mode and that supplies a regulated voltage onto the terminal in a second operating mode, the apparatus comprising:
a low-power switch detect circuit comprising a current mirror, a resistor, and an inverter, wherein the current mirror comprises a first leg and a second leg, the first leg being connected to the terminal, the second leg being connected to the resistor and the inverter;
wherein the low-power switch detect circuit detects whether a current supplied by the low-power switch detect circuit to the terminal through the first leg in the first operating mode exceeds a threshold current;
wherein the low-power switch detect circuit outputs a first digital logic value when the low-power switch detect circuit detects that the current through the second leg exceeds the threshold current, and wherein the low-power switch detect circuit outputs a second digital logic value when the low-power switch detect circuit detects that the current through the second leg does not exceed the threshold current.

25. The apparatus of claim 14, wherein the low-power switch detect circuit detects whether the current supplied by the low-power switch detect circuit exceeds the threshold current by mirroring the current, generating a voltage with the mirrored current, and detecting changes in the generated voltage.

26. The method of claim 1, wherein generating the digital signal based on a level of the first current further comprises generating a voltage with the first mirrored current and detecting changes in the generated voltage.

* * * * *